(12) United States Patent
Kaneko et al.

(10) Patent No.: US 11,346,670 B2
(45) Date of Patent: May 31, 2022

(54) POSITION ESTIMATING DEVICE

(71) Applicant: Hitachi Automotive Systems, Ltd., Hitachinaka (JP)

(72) Inventors: Alex Masuo Kaneko, Tokyo (JP); Kenjiro Yamamoto, Tokyo (JP); Shigenori Hayase, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 298 days.

(21) Appl. No.: 16/612,570

(22) PCT Filed: May 18, 2018

(86) PCT No.: PCT/JP2018/019240
§ 371 (c)(1),
(2) Date: Nov. 11, 2019

(87) PCT Pub. No.: WO2018/225480
PCT Pub. Date: Dec. 13, 2018

(65) Prior Publication Data
US 2020/0132471 A1 Apr. 30, 2020

(30) Foreign Application Priority Data
Jun. 5, 2017 (JP) .............................. JP2017-111202

(51) Int. Cl.
*G05D 1/00* (2006.01)
*G01C 21/28* (2006.01)
*G06T 7/246* (2017.01)

(52) U.S. Cl.
CPC .............. *G01C 21/28* (2013.01); *G06T 7/246* (2017.01); *G06T 2207/30252* (2013.01)

(58) Field of Classification Search
CPC .... G01C 21/28; G01C 21/3602; G01C 21/20; G01C 21/26; G06T 7/246;
(Continued)

(56) References Cited

U.S. PATENT DOCUMENTS 6,025,790 A 2/2000 Saneyoshi
9,175,955 B2 * 11/2015 Vogel ......................... G06T 7/73
(Continued)

FOREIGN PATENT DOCUMENTS

JP 11-51650 A 2/1999
JP 2010-3253 A 1/2010
(Continued)

OTHER PUBLICATIONS https://web.archive.org/web/20090424193057/https://www.merriam-webster.com/dictionary/azimuth azimuth dictionary definition (Year: 2009).*

(Continued)

*Primary Examiner* — Vivek D Koppikar
*Assistant Examiner* — Andrew James Trettel
(74) *Attorney, Agent, or Firm* — Crowell & Moring LLP

(57) ABSTRACT

A position estimating device is provided with an image acquiring unit that acquires images around a moving body, a moving body movement amount estimating unit that estimates an amount of movement of the moving body based on the images, and a moving body position estimating unit that estimates the position of the moving body based on the estimated amount of movement. The moving body movement amount estimating unit includes a tracking unit that tracks a first feature point to a second feature point, a distance calculating unit that calculates the distance from the moving body to the second feature point, an azimuth estimating unit that estimates the azimuth of the moving body based on the distance from the moving body to the second feature point, and a movement amount estimating unit which estimates the amount of movement of the moving body based on the azimuth of the moving body.

4 Claims, 6 Drawing Sheets

(58) Field of Classification Search
CPC . G06T 2207/30252; G06T 2207/10016; G06T 2207/30244; G06T 7/20; G06T 7/70; G06T 7/73; B60R 1/00; B60W 2420/42
See application file for complete search history.

(56) References Cited

U.S. PATENT DOCUMENTS

| | | | | |
|---|---|---|---|---|
| 9,967,526 | B2* | 5/2018 | Wang | H04N 7/183 |
| 10,176,386 | B2* | 1/2019 | Rao | B60W 40/105 |
| 2006/0139619 | A1* | 6/2006 | Fujii | G06T 7/73 |
| | | | | 356/28 |
| 2010/0027847 | A1 | 2/2010 | Ess et al. | |
| 2010/0318289 | A1* | 12/2010 | Sambongi | G01C 21/20 |
| | | | | 701/533 |
| 2013/0106833 | A1* | 5/2013 | Fun | G06T 7/73 |
| | | | | 345/419 |
| 2014/0333741 | A1 | 11/2014 | Roumeliotis et al. | |
| 2014/0376821 | A1* | 12/2014 | Meir | G01S 17/89 |
| | | | | 382/218 |
| 2016/0127692 | A1* | 5/2016 | Yoneji | G06K 9/00664 |
| | | | | 348/159 |
| 2017/0193307 | A1* | 7/2017 | Stelzer | G06K 9/00771 |
| 2021/0201523 | A1* | 7/2021 | Diessner | G06T 7/248 |

FOREIGN PATENT DOCUMENTS

| | | | | |
|---|---|---|---|---|
| JP | 2010033447 | A | * | 2/2010 |
| JP | 2012127896 | A | * | 7/2012 |
| JP | 2013-3110 | A | | 1/2013 |
| JP | 2015108604 | | * | 6/2015 |
| JP | 2017058274 | A | * | 3/2017 ............. G06T 7/246 |

OTHER PUBLICATIONS

International Search Report (PCT/ISA/210) issued in PCT Application No. PCT/JP2018/019240 dated Sep. 4, 2018 with English translation (five pages).
Japanese-language Written Opinion (PCT/ISA/237) issued in PCT Application No. PCT/JP2018/019240 dated Sep. 4, 2018 (five pages).
Campbell et al., "A Robust Visual Odometry and Precipice Detection System Using Consumergrade Monocular Vision", ICRA, 2005, seven pages.

* cited by examiner

POSITION ESTIMATING DEVICE

TECHNICAL FIELD

The present invention relates to a position estimating device that estimates the position of a moving body such as a robot or a car.

BACKGROUND ART

In the related art, an autonomous traveling technology and a driving support technology in which a moving body such as a robot or a vehicle collects information around the moving body, estimates a current position and a traveling state of the moving body, and controls traveling of the moving body have been developed. Various sensors are used to collect the information around the moving body. In general, as a sensor for measuring the information around the moving body, there are an imaging device such as a camera, a laser sensor, and a millimeter wave radar. The Global Positioning System (GPS) or an Inertial Measurement Unit (IMU) is used as a sensor for measuring a position of the moving body.

In the autonomous traveling control, for example, a control device mounted on the moving body estimates a position (self-position) of the moving body itself by integrating a velocity or an angular velocity of the moving body calculated by the IMU or using GPS positioning. Furthermore, the control device collects the information around the moving body by using a laser sensor or a camera, and detects a landmark such as a road surface paint or a sign which is a reference during position estimation. The control device corrects the current position of the moving body by comparing a position of the detected landmark with map information.

In environments such as parking lots and tunnels, since there are no map information and landmark, the GPS may not be used. Thus, an odometry method of estimating a relative position of the moving body to an object present around the moving body is used. When the odometry method is performed on an image, an image is acquired at a first timing, and a feature point on the image acquired by an image processing technology is extracted. An image is acquired at a second timing, and the feature point extracted from the image at the first timing is tracked to the image acquired at the second timing, and the amount of movement of the camera is estimated by using the amounts of movement of the feature points on the images at the first timing and the second timing. However, in order to estimate the amount of movement of the camera, since the least squares method and trial and error are required, a processing load is large.

Here, for example, in "A Robust Visual Odometry and Precipice Detection System Using Consumer-grade Monocular Vision", a three-dimensional image odometry is performed by dividing a region of an image acquired by a monocular camera into a far region and a near region in order to reduce a processing load of an image odometry. Since the amount of movement of the far feature point on the image extracted from the far region is constant, an azimuth of the camera is estimated by using the amount of movement of the far feature point and the constant parameter k. Subsequently, on the assumption that the road surface is flat, a distance to the near feature point extracted from the near region is geometrically calculated at an installation height and an angle of the camera, and the amount of movement of the camera is estimated by using the azimuth estimated at the far feature point and the amount of movement of the near feature point.

CITATION LIST

Patent Literature

NPL 1: Jason Campbell et al. "A Robust Visual Odometry and Precipice Detection System Using Consumer-grade Monocular Vision", ICRA 2005.

SUMMARY OF INVENTION

Technical Problem

In "A Robust Visual Odometry and Precipice Detection System Using Consumer-grade Monocular Vision", the feature point in the far region of the image is processed as the far feature point actually far away from the moving body. However, the feature point in the far region of the image may not be necessarily the far feature point. For example, a three-dimensional object present near the moving body may appear in the far region of the image in some traveling environments. In this case, since the amount of movement on the image is not constant, there is a problem that an error is large in the azimuth estimated by using the constant parameter k.

An object of the present invention is to provide a position estimating device that accurately estimates a position of a moving body.

Solution to Problem

In order to achieve the object, the present invention provides a position estimating device that estimates a position of a moving body based on the amount of movement of the moving body. The device includes an image acquiring unit that acquires an image around the moving body, a moving body movement amount estimating unit that estimates the amount of movement of the moving body based on the image acquired by the image acquiring unit, and a moving body position estimating unit that estimates the position of the moving body based on the amount of movement estimated by the moving body movement amount estimating unit. The moving body movement amount estimating unit includes a first feature point extracting unit that extracts a first feature point from a first image acquired by the image acquiring unit at a first timing, a second feature extracting unit that extracts a second feature point from a second image acquired by the image acquiring unit at a second timing later than the first timing, a tracking unit that tracks the first feature point to the second feature point, a distance calculating unit that calculates a distance of the second feature point tracked by the tracking unit from the moving body, an azimuth estimating unit that estimates an azimuth of the moving body based on the distance of the second feature point from the moving body calculated by the distance calculating unit, and a movement amount estimating unit that estimates the amount of movement of the moving body based on the azimuth of the moving body estimated by the azimuth estimating unit.

Advantageous Effects of Invention

According to the present invention, it is possible to provide a position estimating device that accurately estimates a position of a moving body.

Other objects, configurations, and effects will be made apparent in the following descriptions.

DESCRIPTION OF EMBODIMENTS

Hereinafter, an embodiment of the present invention will be described with reference to the accompanying drawings. Although the accompanying drawings and the following descriptions illustrate specific embodiments based on the principles of the present invention, the drawings and descriptions are provided for understanding the present invention, and are not used for restrictively interpret the present invention.

First Embodiment

Figure 1:
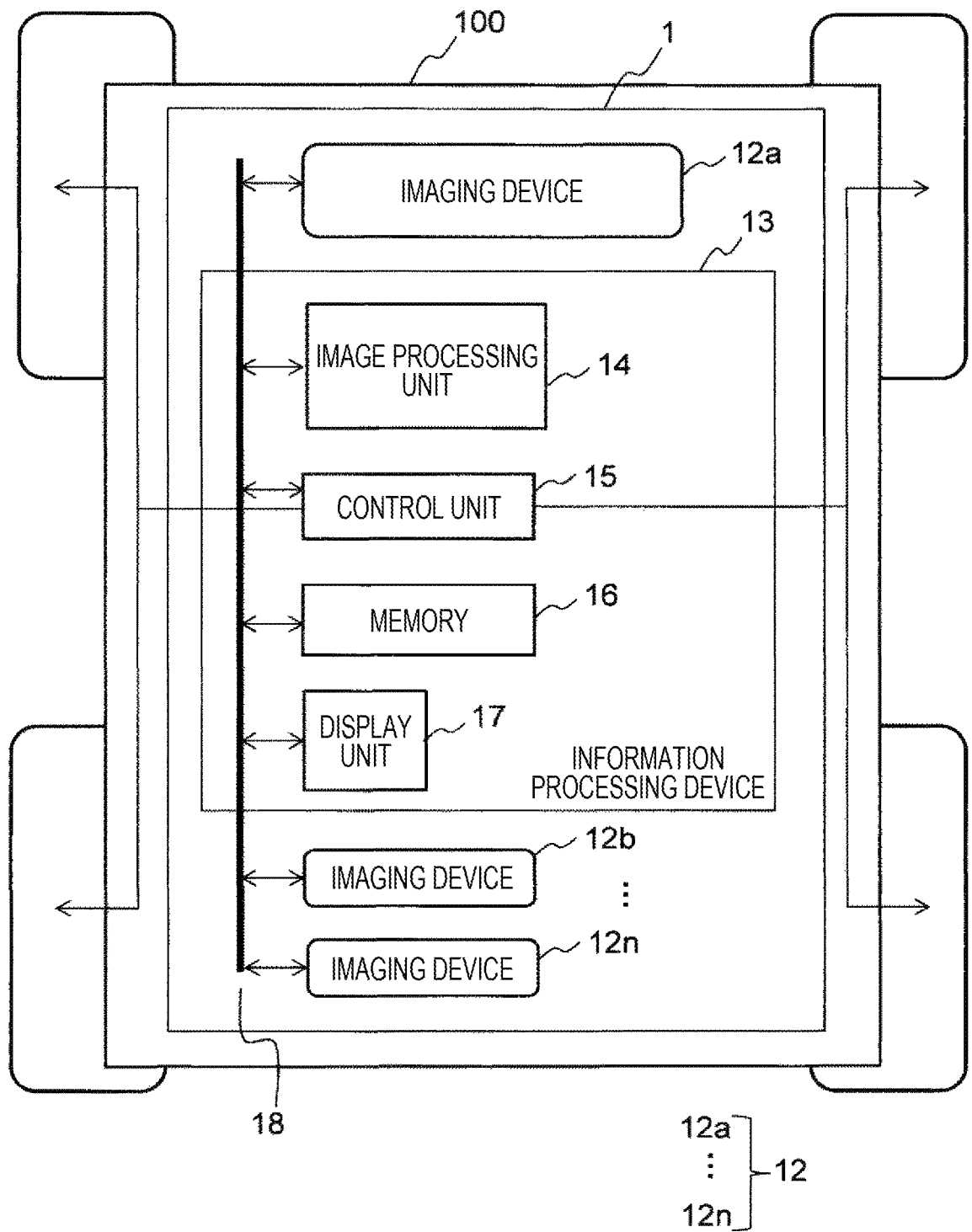
FIG. 1 is a block diagram illustrating a configuration of a position estimating device 1 according to a first embodiment of the present invention.

FIG. 1 is a block diagram illustrating a configuration of a position estimating device 1 according to a first embodiment of the present invention.

The position estimating device 1 is mounted on a moving body 100 such as a vehicle or a robot. The position estimating device 1 includes one or more imaging devices 12 (imaging devices 12a, 12b, . . . , and 12n in FIG. 1) and an information processing device 13. In the following description, the imaging device 12 refers to each of the imaging devices 12a, 12b, . . . , and 12n. In the present embodiment, although a position of the moving body 100 is estimated based on an image captured by the imaging device 12, the present invention is not limited thereto. For example, an image around the moving body 100 may be acquired by another moving body or a stationary body different from the moving body 100, and the position of the moving body 100 may be estimated based on this image.

The imaging device 12 may be, for example, a still camera or a video camera. The imaging device 12 may be a monocular camera (camera having one imaging unit) or a stereo camera (camera having a plurality of imaging units and capable of capturing a parallax image).

The information processing device 13 processes the image captured by the imaging device 12 to calculate the position or the amount of movement of the moving body 100. The information processing device 13 may perform display corresponding to the calculated position or amount of movement, or may output a signal related to control of the moving body 100.

The information processing device 13 is, for example, a general computer, and includes an image processing unit 14 that processes the image captured by the imaging device 12, a control unit (CPU) 15 that performs processing based on an image processing result of the image processing unit 14, a memory 16, a display unit 17 such as a display, and a bus 18 that interconnects these components. The information processing device 13 may perform the following processing by the image processing unit 14 and the control unit 15 executing predetermined computer programs.

For example, the imaging device 12a is provided in front of the moving body 100. A lens of the imaging device 12a heads toward a front side of the moving body 100. For example, the imaging device 12a captures a distant view in front of the moving body 100. The other imaging devices 12b, . . . , and imaging device 12n are provided at different positions from the imaging device 12a, and capture an image in an imaging direction or a region different from the imaging device 12a.

For example, the imaging device 12b may be provided rearward of the moving body 100 so as to face downward.

The imaging device 12b may be for capturing a near view rearward of the moving body 100.

When the imaging device 12 is the monocular camera and a road surface is flat, since a pixel position on the captured image and an actual positional relationship (x, y) become constant, it is possible to geometrically calculate a distance from the moving body to a feature point based on the image captured by the imaging device 12. When the imaging device 12 is the stereo camera, it is possible to accurately measure the distance to the feature point on the image. Although an example in which a camera having a monocular standard lens is adopted will be described in the following description, the present invention may be other cameras (such as a camera having a wide-angle lens or a stereo camera).

In addition, objects captured by the imaging device 12a, the imaging device 12b, . . . , and the imaging device 12n at a certain time may be different from each other. For example, the imaging device 12a may capture the distant view in front of the moving body 100. In this case, a feature point such as an obstacle or a landmark for position estimation may be extracted from an image acquired by capturing the distant view. The imaging device 12b may capture the near view such as a road surface around the moving body 100. In this case, a feature point such as a white line or a road surface paint around the moving body 100 may be detected from an image acquired by capturing the near view.

In addition, the imaging device 12a, the imaging device 12b, . . . , and the imaging device 12n may be provided on the moving body 100 under a condition in which these imaging devices are not simultaneously influenced by environmental disturbances such as rain and sunlight. For example, the imaging device 12a may be disposed forward of the moving body 100 so as to face forward, whereas the imaging device 12b may be disposed rearward of the moving body 100 so as to face rearward or downward. Accordingly, for example, even when raindrops adhere to the lens of the imaging device 12a during rainfall, the raindrops are less likely to adhere to the lens of the imaging device 12b so as to face an opposite direction or downward in a traveling direction. Therefore, even though the image captured by the imaging device 12a is unclear due to the influence of the raindrops, the image captured by the imaging device 12b is less influenced by the raindrops. Alternatively, even though the image of the imaging device 12a is unclear due to the influence of the sunlight, the image captured by the imaging device 12b may be clear.

The imaging device 12a, the imaging device 12b, . . . , and the imaging device 12n may capture images under different imaging conditions (diaphragm value and white balance). For example, the imaging device may capture images regardless of environment brightness by mounting an imaging device of which a parameter is adjusted for a bright place and an imaging device of which a parameter is adjusted for a dark place.

When a command to start the capturing is received from the control unit 15, or at constant time intervals, the imaging device 12a, the imaging device 12b, . . . , and the imaging device 12n may capture images. Image data and imaging times of the images captured by the imaging device 12a, the imaging device 12b, . . . , and the imaging device 12n are stored in the memory 16.

The memory 16 includes a main storage device (main memory) of the information processing device 13 and an auxiliary storage device such as a storage.

The image processing unit 14 performs various image processing based on the image data and the imaging times stored in the memory 16. In this image processing, for example, an intermediate image is created and stored in the memory 16. The intermediate image may be used for determination or processing in the image processing unit 14 in addition to processing in the control unit 15.

The bus 18 can be Inter Equipment Bus (IEBUS), Local Interconnect Network (LIN), or Controller Area Network (CAN).

The image processing unit 14 specifies a plurality of position candidates of the moving body 100 based on the image captured by the imaging device 12, and estimates the position of the moving body 100 based on the plurality of position candidates and a moving speed of the moving body 100.

For example, the image processing unit 14 processes the image captured by the imaging device 12 while the moving body 100 is traveling, and estimates the position of the moving body 100. For example, the image processing unit 14 may calculate the amount of movement of the moving body 100 on a video image captured by the imaging device 12, and may estimate a current position by adding the amount of movement to a start point.

The image processing unit 14 may extract feature points on frame images of the video image. The image processing unit 14 further extracts the same feature point on the next and subsequent frame images. The image processing unit 14 may calculate the amount of movement of the moving body 100 by tracking (tracing) of the feature points.

The control unit 15 may output a command regarding the moving speed to the moving body 100 based on the image processing result of the image processing unit 14. For example, the control unit 15 outputs a command to increase, a command to decrease, or a command to maintain the moving speed of the moving body 100 depending on the number of pixels of the obstacle in the image, the number of outlier values of the feature points in the image, or the type of the image processing.

Figure 2:
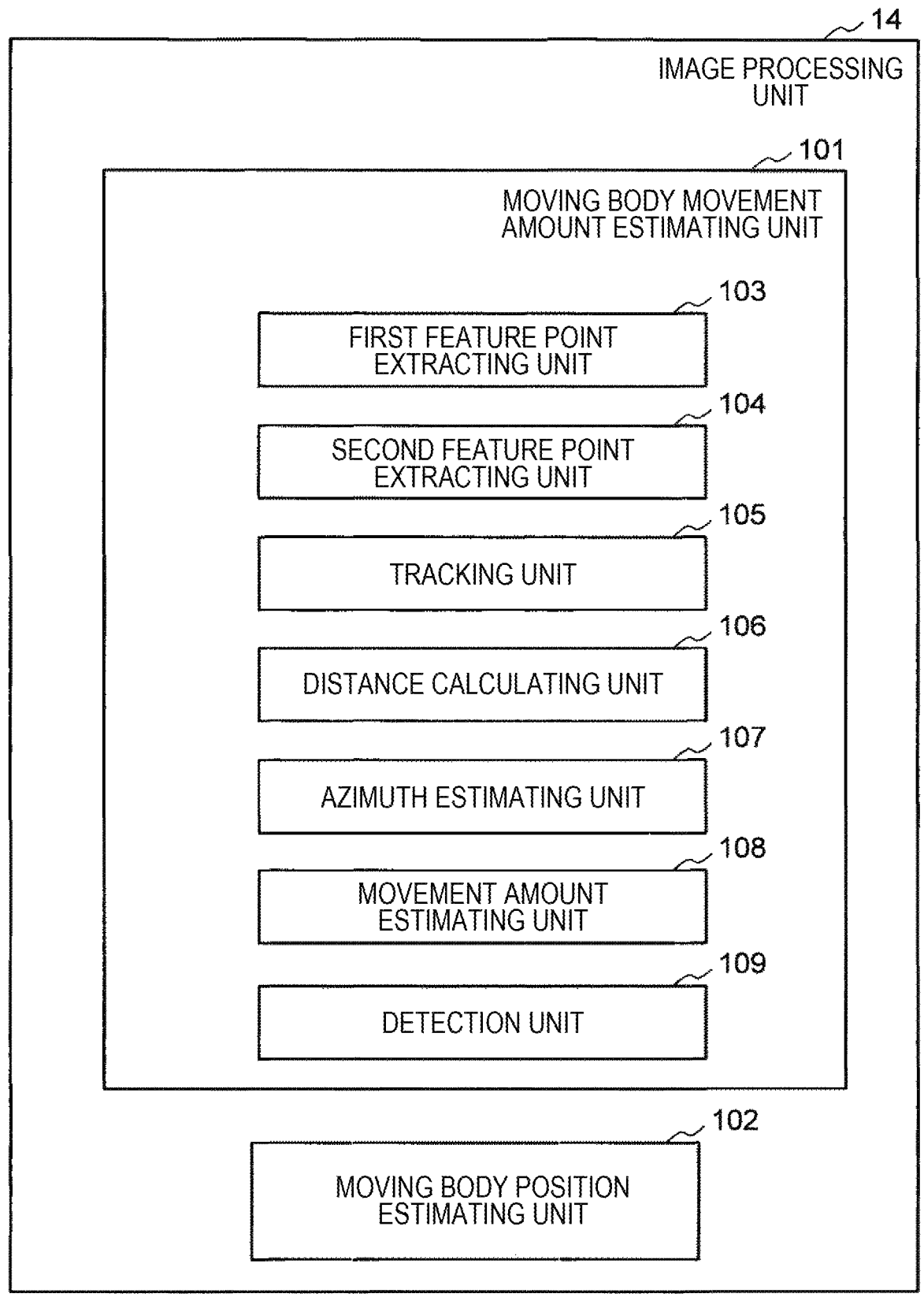
FIG. 2 is a functional block diagram of an image processing unit 14 illustrated in FIG. 1.

FIG. 2 is a functional block diagram of the image processing unit 14 illustrated in FIG. 1.

The image processing unit 14 includes a moving body movement amount estimating unit 101 that estimates the amount of movement of the moving body 100 based on the image captured by the imaging device 12 and a moving body position estimating unit 102 that estimates the position of the moving body 100 based on the amount of movement estimated by the moving body movement amount estimating unit 101.

As will be described in detail below, the moving body movement amount estimating unit 101 includes a first feature point extracting unit 103 that extracts first feature points from a first image captured by the imaging device 12 at a first timing, a second feature point extracting unit 104 that extracts second feature points from a second image captured by the imaging device 12 at a second timing later than the first timing, a tracking unit 105 that tracks the first feature points to the second feature points, a distance calculating unit 106 that calculates a distance of the second feature point from the moving body 100 tracked by the tracking unit 105, an azimuth estimating unit 107 that estimates an azimuth of the moving body 100 based on the distance of the second feature point from the moving body 100 calculated by the distance calculating unit 106, and a movement amount estimating unit 108 that estimates the amount of movement of the moving body 100 based on the azimuth of the moving body 100 estimated by the azimuth estimating unit 107.

As will be described in detail below, the moving body movement amount estimating unit 101 includes a detection unit 109 that detects whether or not each of the plurality of first feature points and each of the plurality of second feature points are feature points extracted from another moving body (for example, moving body 63 illustrated in FIG. 7) different from the moving body 100, and the azimuth estimating unit 107 removes the feature points detected as the feature points extracted from the other moving body 63 by the detection unit 109 from the plurality of first feature points and the plurality of second feature points.

Figure 3:
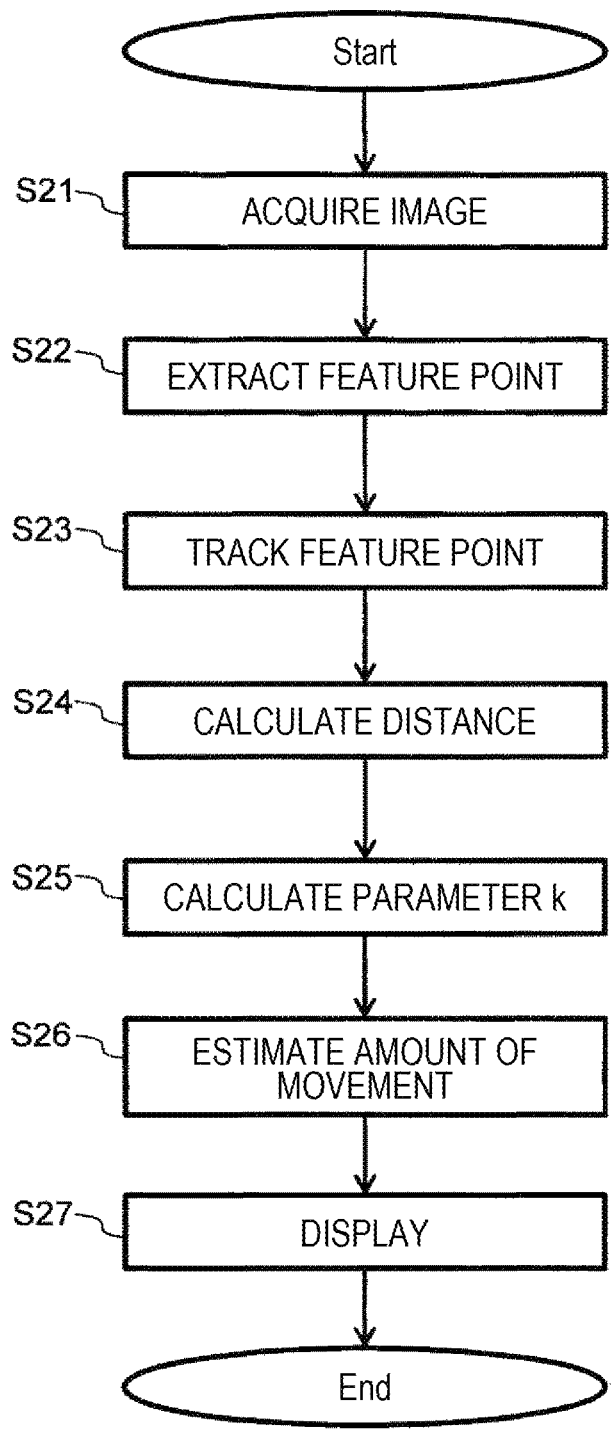
FIG. 3 is a flowchart illustrating an image processing procedure performed by the image processing unit 14 illustrated in FIG. 1.

FIG. 3 is a flowchart illustrating an image processing procedure performed by the image processing unit 14 illustrated in FIG. 1.

The image processing unit 14 acquires image data captured by the imaging device 12a, the imaging device 12b, ..., and the imaging device 12n from the memory 16 (step S21). The image data acquired in step S21 may be only one or a plurality of image data of the images captured by the imaging device 12a, the imaging device 12b, ..., and the imaging device 12n. Further, step S21 may be not only the latest image captured by each of the imaging device 12a, the imaging device 12b, ..., and the imaging device 12n, but also an image captured in the past. Hereinafter, a case where frame images captured in time series are acquired will be described.

Subsequently, the first feature point extracting unit 103 and the second feature point extracting unit 104 of the image processing unit 14 extract feature points in each of the acquired frame images (step S22). The feature point may be, for example, an edge or corner in the image or a maximum value or a minimum value of pixel intensities. Techniques such as Canny, Sobel, FAST, Hessian, and Gaussian may be used in the extraction of the feature points. A specific algorithm is appropriately selected depending on the feature of the image.

The tracking unit 105 of the image processing unit 14 tracks (traces) the feature points extracted in each of the frame images according to the time series of the frame images (step S23). Techniques such as a Lucas-Kanade method, a Shi-Tomasi method, and a Direct Matching method may be used in the tracking. Further, the tracking in step S23 is not limited to the feature points of the frames acquired immediately before or immediately after, but may be at intervals of several frames. A specific algorithm is appropriately selected depending on the feature of the image.

Subsequently, the distance calculating unit 106 of the image processing unit 14 calculates the distance to the feature point (the distance from the moving body 100 to the feature point. Hereinafter, referred to the distance from the moving body 100 to the feature point when this distance is simply referred to as the "distance to the feature point", the "distance of the feature point", or the "distance for the feature point") for each of the feature points tracked in step S23 (step S24). The distance of the feature point may be geometrically calculated by using installation heights and angles of the imaging device 12a, the imaging device 12b, ..., and the imaging device 12n. When the imaging device 12a, the imaging device 12b, ..., and the imaging device 12n are stereo cameras, the distances may be calculated by using parallax images. The imaging device 12a, the imaging device 12b, ..., and the imaging device 12n may be acquired by combining the monocular camera and the stereo camera. Any camera or combination may be used as long as the device can ultimately calculate the distance for the feature point appearing in the image.

Subsequently, the azimuth estimating unit 107 of the image processing unit 14 calculates a parameter k for estimating the azimuth of the moving body 100 based on the distance calculated in step S24 (step S25). Details of the parameter k will be described below.

Subsequently, the movement amount estimating unit 108 of the image processing unit 14 estimates the amount of movement of the moving body 100 based on the tracking result of the feature points (step S26). Details of the estimation of the amount of movement of the moving body 100 will be described below.

Subsequently, the image processing unit 14 displays information such as the image, the feature point, the distance for the feature point (the distance from the moving body 100 to the feature point), and the estimated amount of movement acquired in above-described steps S21 to S26 on the display unit 17 (step S27). Only any information may be displayed, or all information may be displayed.

Now, the principle of the position estimation using a constant parameter k in "A Robust Visual Odometry and Precipice Detection System Using Consumer-grade Monocular Vision) which is the related art will be described with reference to FIGS. 4A and 4B.

Figure 4A:
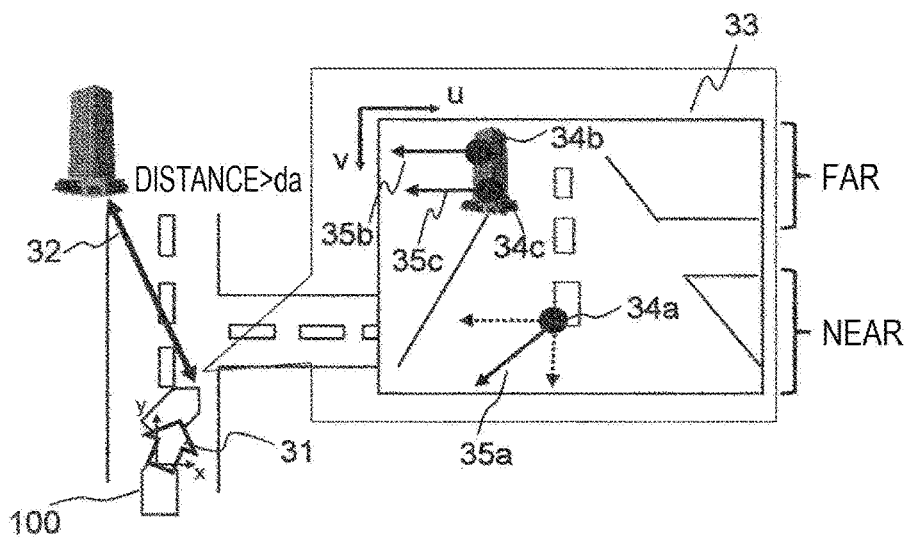
FIG. 4A is a diagram for describing a principle of position estimation using a constant parameter k in the related art, and is a diagram illustrating a positional relationship between a moving body 100 and a three-dimensional object and illustrating an image acquired by capturing the three-dimensional object.

FIG. 4A is a diagram for describing the principle of the position estimation using a constant parameter k in the related art, and is a diagram illustrating a positional relationship between the moving body 100 and a three-dimensional object and an image acquired by capturing the three-dimensional object.

Figure 4B:
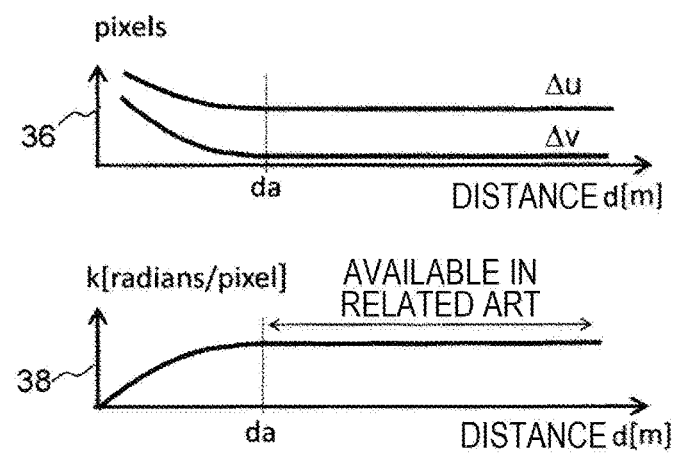
FIG. 4B is a diagram for describing the principle of the position estimation using the constant parameter k in the related art, in which a graph 36 is a graph representing a relationship between the amount of movement of a feature point on an image and a distance d of a three-dimensional object from which the feature point is extracted, and a graph 38 is a graph representing a relationship between the parameter k and the distance d of the three-dimensional object from which the feature point is extracted.

FIG. 4B is a diagram for describing the principle of the position estimation using the constant parameter k in the related art. A graph 36 is a graph representing a relationship between the amount of movement of the feature point on the image and a distance d of the three-dimensional object from which the feature point is extracted, and a graph 38 is a graph representing a relationship between the parameter k (radians/pixel) and the distance d of the three-dimensional object from which the feature point is extracted.

Initially, the description is made with reference to FIG. 4A. The amount of movement 31 is the amount of movement traveled by the moving body 100. Here, for the sake of simplicity, it is assumed that the amount of movement 31 includes a change ($\Delta x$) in an x direction, a change ($\Delta y$) in a y direction, and a change ($\Delta yaw$) in an azimuth (yaw) of the moving body 100.

A distance 32 is a distance from a position after the moving body 100 travels by the amount of movement 31 to a far three-dimensional object located far away.

A frame 33 is one of the images captured by the imaging device 12a, the imaging device 12b, ..., and the imaging device 12n after the moving body 100 travels by the amount of movement 31. In the frame 33, for the sake of easiness in illustration, a position of the three-dimensional object captured before the moving body 100 travels is indicated, and movement directions and amounts of movement of the feature points due to traveling are indicated by arrows of the amount of movement 35a, the amount of movement 35b, and the amount of movement 35c.

The amounts of movement of a feature point 34a, a feature point 34b, and a feature point 34c extracted in steps S21 to S23 on the image are the amount of movement 35a, the amount of movement 35b, and the amount of movement 35c, respectively. These feature points are the first feature point before the movement, and are the second feature points after the movement.

After the moving body 100 travels by the amount of movement 31, the amount of movement 35a of the near feature point 34a on the image is u≠0 and v≠0, but the amount of movement 35b of the far feature point 34b and the amount of movement 35c of the feature point 34c are u≠0 and v is almost zero.

In addition, since the feature point 34b and the feature point 34c are extracted from the three-dimensional object from which the feature point 34a is extracted (here, not the three-dimensional object but the white line of the road surface in the example of FIGS. 4A and 4B) and are closer to the moving body 100 than the three-dimensional object, the amount of movement 35a>amount of movement 35b, and amount of movement 35a>amount of movement 35c on the image.

Accordingly, since the amount of movement 35b of the far feature point 34b and the amount of movement 35c of the far feature point 34c on the image depend on only $\Delta yaw$ of the moving body 100 and these feature points move only in the u direction of the frame 33, it is possible to estimate the Δyaw of the moving body 100 by only the amount of movement of the far feature points on the image.

Meanwhile, since the amount of movement 35a of the near feature point 34a on the image is influenced by Δyaw and (Δx, Δy) of the moving body 100, these feature points move in the u direction and the v direction of the frame 33. Accordingly, since Δyaw and (Δx, Δy) are mixed, the amounts of movement of the near feature points on the image are not be able to be estimated.

Here the graph 36 representing the relationship between the amount of movement of the feature point on the image and the distance d of the three-dimensional object from which the feature point is extracted (the distance d from the moving body 100 to the three-dimensional object) is illustrated in FIG. 4B. In the graph 36, a vertical axis represents the amount of movement of the feature point on the image (a curve of Δu is the amount of movement in the u direction and a curve of Δv is the amount of movement in the v direction), and a horizontal axis is the distance d of the three-dimensional object.

Further, the graph 38 representing the relationship between the parameter k and the distance d of the three-dimensional object from which the feature point is extracted is illustrated by a lower graph in FIG. 4B. In the graph 38, a vertical axis is the parameter k, and a horizontal axis is the distance d of the three-dimensional object.

As can be seen from the graph 36, when the distance d of the feature point acquired in steps S21 to S23 is smaller than a distance da, Δu and Δv on the image depending on the amount of movement 31 and the distance d for the feature point are greatly changed. Meanwhile, when the distance d of the feature point acquired in step S21 to step S23 is longer than the distance da, Δu and Δv on the image are constant regardless of the distance d for the feature point. Therefore, when the distance d of the feature point acquired in step S21 to step 23 is longer than the distance da, it is possible to estimate the azimuth of the moving body 100 by using Δu and the constant parameter k, as represented by the graph 38 and Expression 1.

$$\Delta yaw = k \cdot \Delta u \qquad \text{[Expression 1]}$$

Meanwhile, when the distance d of the feature point acquired in steps S21 to S23 is smaller than the distance da, since Δu and Δv on the image are not constant, when the azimuth is estimated, the azimuth is not able to be accurately estimated by using the constant parameter k.

Although the distance da varies depending on the image quality and the angle of view of the imaging device 12a, the imaging device 12b, . . . , and the imaging device 12n, the distance da is set empirically.

Figure 5A:
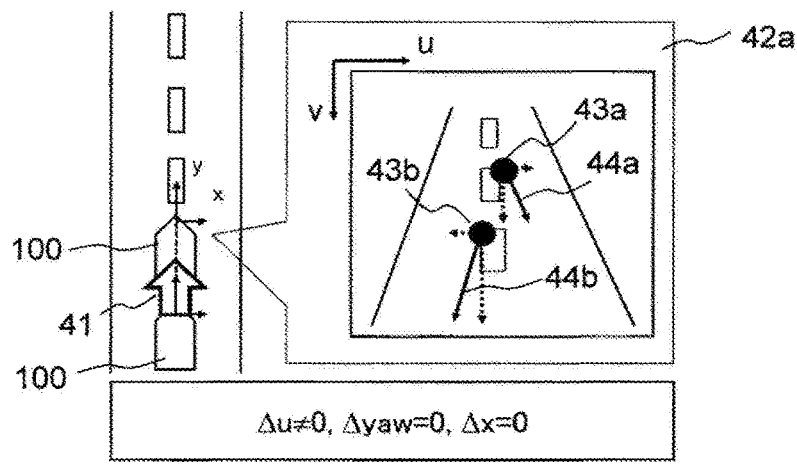
FIG. 5A is a diagram for describing a position estimating method when the distance d of the three-dimensional object is closer than a distance da according to the first embodiment, and illustrates a case where the moving body 100 moves by the amount of movement 41.

FIG. 5A is a diagram for describing a position estimating method when the distance d of the three-dimensional object is closer than the distance da according to the first embodiment, and is a diagram illustrating a case where the moving body 100 moves by the amount of movement 41.

Figure 5B:
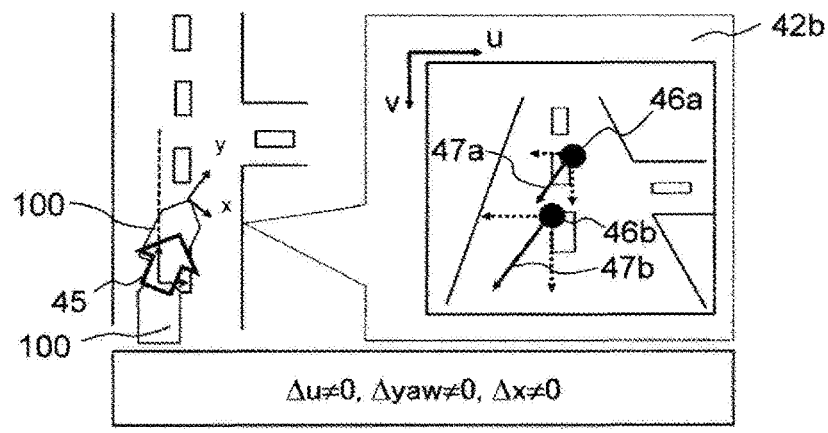
FIG. 5B is a diagram for describing the position estimating method when the distance d of the three-dimensional object is closer than the distance da according to the first embodiment, and illustrates a case where the moving body 100 moves by the amount of movement 45.

FIG. 5B is a diagram for describing the position estimating method when the distance d of the three-dimensional object is closer than the distance da according to the first embodiment, and is a diagram illustrating a case where the moving body 100 moves by the amount of movement 45.

The amount of movement 41 in FIG. 5A is the amount of movement of the moving body 100. For the sake of simplicity, it is assumed that Δyaw, Δx, and Δy of the amount of movement 41 of the moving body 100 are Δyaw=0, Δx=0, and Δy≠0.

An image 42a represents one of the images captured by the imaging device 12a, the imaging device 12b, . . . , and the imaging device 12n after the moving body 100 travels by the amount of movement 41. On the image 42a, for the sake of easiness in illustration, a position of the three-dimensional object captured before the moving body 100 travels is indicated, and movement directions and amounts of movement of the feature points due to traveling are indicated by arrows of the amount of movement 44a and the amount of movement 44b.

The feature point 43a and the feature point 43b are near feature points acquired in steps S21 to S23.

The amount of movement 44a and the amount of movement 44b are the amounts of movement of the near feature point 43a and the near feature point 43b acquired in steps S21 to S23 on the image 42. Here, since Δu of the amount of movement 44a and the amount of movement 44b is Δu≠0, when Δu is substituted into Expression 1 which is the above-mentioned expression of the related art, Δyaw≠0, and Δyaw of the moving body 100 is erroneously estimated. Meanwhile, on the image 42, the actual Δx of Δu on the image captured by the imaging device 12a, the imaging device 12b, . . . , and the imaging device 12n after the moving body 100 travels by the amount of movement 41 is Δx=0.

The amount of movement 45 of FIG. 5B is the amount of movement traveled by the moving body 100. In this case, Δyaw, Δx, and Δy of the amount of movement 45 of the moving body 100 are Δyaw≠0, Δx≠0, and Δy≠0.

The image 42b represents one of the images captured by the imaging device 12a, the imaging device 12b, . . . , and the imaging device 12n after the moving body 100 travels by the amount of movement 45. On the image 42b, for the sake of easiness in illustration, a position of the three-dimensional object captured before the moving body 100 travels is indicated, and movement directions and amounts of movement of the feature points due to traveling are indicated by arrows of the amount of movement 44a and the amount of movement 44b.

The feature points 46a and 46b are near feature points acquired in steps S21 to S23.

The amount of movement 47a and the amount of movement 47b are the amounts of movement of the near feature point 46a and the near feature point 46b acquired in steps S21 to S23 on the image 42b. Here, since Δu of the amount of movement 47a and the amount of movement 47b is Δu≠0, when Δu is substituted into Expression 1 which is the above-mentioned expression of the related art, Δyaw≠0, but the distance for the feature point 46b is smaller than the distance for the feature point 46a, the amount of movement 47a<the amount of movement 47b, and Δyaw estimated by using the amount of movement 47a is different from Δyaw estimated by using the amount of movement 47b. Meanwhile, on the image 42b, the actual Δx of Δu on the image captured by the imaging device 12a, the imaging device 12b, . . . , and the imaging device 12n after the moving body 100 travels by the amount of movement 45 is Δx≠0.

As can be seen from the description of FIGS. 5A and 5B, not Δu used in the related art but Δx (that is, the amount of movement in a horizontal direction) is changed with Δyaw. Accordingly, when Δyaw is estimated at the near feature point, the distance d for the feature point and the actual Δx of the feature point may be used.

Figure 6A:
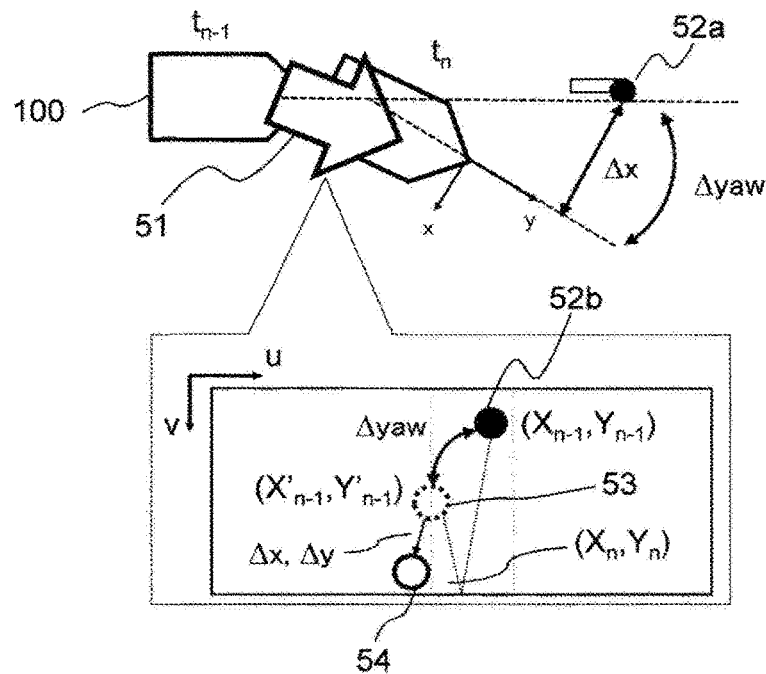
FIG. 6A is a diagram for describing the details of the position estimating method using Δx and the distance for the feature point of the first embodiment, and is a diagram illustrating a positional relationship between the moving body 100 and the feature point and illustrating an image acquired by capturing the feature point.

FIG. 6A is a diagram for describing the details of the position estimating method using Δx and the distance for the feature point of the first embodiment, and is a diagram illustrating a positional relationship between the moving body 100 and the feature point and illustrating the image acquired by capturing the feature point.

Figure 6B:
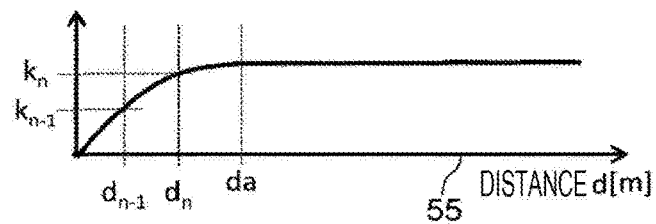
FIG. 6B is a diagram for describing the details of the position estimating method using Δx and the distance for the feature point of the first embodiment, in which a graph 55 is a graph representing a relationship between the parameter k and the distance of the feature point.

FIG. 6B is a diagram for describing the details of the position estimating method using Δx and the distance for the feature point of the first embodiment. A graph 55 is a graph representing a relationship between the parameter k (radians/pixel) and the distance of the feature point. In the graph 55, a vertical axis is the parameter k, and a horizontal axis is the distance d of the three-dimensional object. The relationship of the graph 55 may be acquired in advance, and may be stored, for example, in the form of a table in the memory 16, or an approximate expression of the relationship of the graph 55 may be stored in the memory 16.

The amount of movement 51 is the amount of movement of the moving body 100 traveling during a period from time $t_{n-1}$ to time $t_n$. It is assumed that Δyaw, Δx, and Δy of the amount of movement 51 are Δyaw≠0, Δx≠0, and Δy≠0.

A point 52a is a point near the moving body 100, and is a point corresponding to a feature point 52b acquired at steps S21 to S23 on the image acquired by the imaging device 12a, the imaging device 12b, . . . , and the imaging device 12n at time $t_{n-1}$. When the moving body 100 moves (Δx, Δy, Δyaw), the feature point 52b moves on the image acquired by the imaging device 12a, the imaging device 12b, . . . , and the imaging device 12n by Δyaw from ($X_{n-1}$, $Y_{n-1}$) to ($X'_{n-1}$, $Y'_{n-1}$), and becomes a point 53. Next, the point 53 becomes a feature point 54 due to the movement of Δx and Δy. That is, the movement from the feature point 52b to the feature point 54 due to the amount of movement 51 is expressed by Expressions 2 and 3.

$$X_n = X_{n-1} \cdot \cos(\Delta yaw_n) - Y_{n-1} \cdot \sin(\Delta yaw_n) + \Delta x \quad \text{[Expression 2]}$$

$$Y_n = X_{n-1} \cdot \sin(\Delta yaw_n) + Y_{n-1} \cdot \cos(\Delta yaw_n) + \Delta y \quad \text{[Expression 3]}$$

However, when it is assumed that the moving body 100 is not able to move in the x direction (for example, is not able to move to the side), Δx is Δx=0. Accordingly, Expression 2 becomes Expression 4, and $\Delta yaw_n$ can be calculated by substituting $X_n$, $Y_{n-1}$, $Y_n$, and $Y_{n-1}$ into Expression 5 from the amounts of movement of the feature points acquired in steps S21 to S23 and solving Expression 5.

$$X_n = X_{n-1} \cdot \cos(\Delta yaw_n) - Y_{n-1} \cdot \sin(\Delta yaw_n) \quad \text{[Expression 4]}$$

$$X_n - X_{n-1} \cdot \cos(\Delta yaw_n) - Y_{n-1} \cdot \sin(\Delta yaw_n) = 0 \quad \text{[Expression 5]}$$

In addition, when the amount of movement in the y direction is known by GPS or other sensors, since it is possible to distinguish the amount of movement in an azimuth and the amount of movement in the y direction from the amounts of movement of the feature points acquired in steps S21 to S23, the feature point 54 is converted to the point 53 by using (Δx, Δy) acquired from GPS and other sensors, and the azimuth is estimated by using the relationship of the graph 55 of FIG. 6B stored in the memory 16 without performing the substituting into Expression 5. Here, a distance $d_{n-1}$ which is the distance for the point 52a at time $t_{n-1}$ and a distance $d_n$ which is the distance for the point 52a at time $t_n$ are calculated by Expressions 6 and 7. In Expressions 6 and 7, Sqrt ( ) is a function for obtaining a positive square root of the value in ( ).

$$d_{n-1} = \text{Sqrt}(X'^2_{n-1} + Y'^2_{n-1}) \quad \text{[Expression 6]}$$

$$d_n = \text{Sqrt}(X_n^2 + Y_n^2) \quad \text{[Expression 7]}$$

Therefore, when the distances $d_{n-1}$ and $d_n$ are substituted into the graph 55, parameters $k_{n-1}$ and $k_n$ are acquired. Δyaw may be estimated from Expression 1 by calculating the average of the parameters $k_{n-1}$ and $k_n$ and calculating a new parameter k. Further, since the moving body 100 moves between times $t_{n-1}$ and $t_n$, the distance for the point 52a is changed from $d_{n-1}$ to the distance $d_n$, and thus, Δyaw may be estimated by Expression 8. In Expression 8, the parameter k is a function of the distance d (that is, k=f (d)), and in Expression 8, the integral is calculated for the distance d in a range of the distance $d_{n-1}$ to the distance $d_n$.

$$\Delta yaw = \int \Delta u \cdot k \quad \text{[Expression 8]}$$

Figure 7:
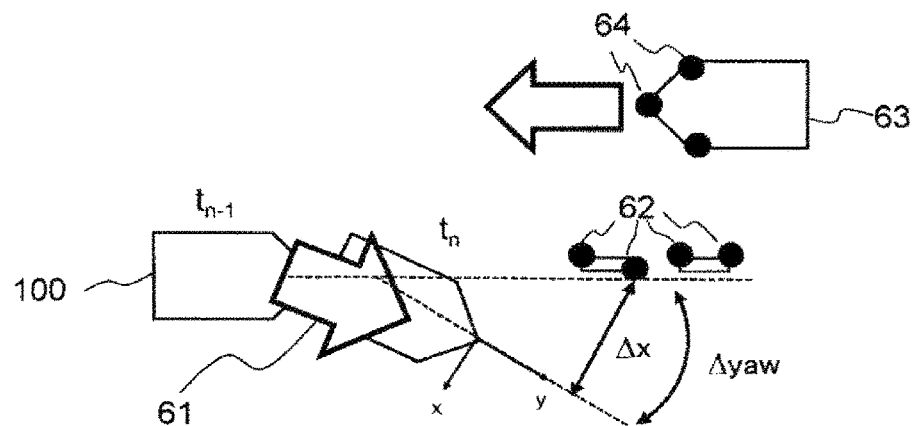
FIG. 7 is a diagram for describing processing when a plurality of feature points is extracted in the first embodiment.

FIG. 7 is a diagram for describing processing in a case where a plurality of feature points is extracted in the first embodiment.

The amount of movement 61 is the amount of movement traveled by the moving body 100.

A stationary point 62 is a point at which the feature point is extracted in steps S21 to S23 on the image when the moving body 100 travels by the amount of movement 61. The stationary point 62 is, for example, a point on a road surface or a building. In addition, the stationary point 62 is not limited to one point, and may be a plurality of points. When position estimation is performed using the stationary point 62 in steps S21 to S26, since candidates for the estimated values (Δx, Δy, Δyaw)$_1$, (Δx, Δy, Δyaw)$_2$, . . . , and (Δx, Δy, Δyaw)$_n$ are acquired for each point, means for ultimately determining the estimated values is essential. Here, the average of the candidates of the estimated values (Δx, Δy, Δyaw)$_1$, (Δx, Δy, Δyaw)$_2$, . . . , and (Δx, Δy, Δyaw)$_n$ calculated from steps S21 to S26 may be calculated, and the estimated values may be determined. Further, the median of the candidates of the estimated values (Δx, Δy, Δyaw)$_1$, (Δx, Δy, Δyaw)$_2$, . . . , and (Δx, Δy, Δyaw)$_n$ acquired in steps S21 to S26 may be calculated, and the estimated values may be determined.

The moving body 63 is a moving body traveling around the moving body 100.

A movement point 64 is a point at which the feature point is extracted from the moving body 63 in step S21 to step S23 on the image when the moving body 100 travels by the amount of movement 61. The movement point 64 is not limited to one point, and may be a plurality of points. Although the movement point 64 is a point on the moving body 63 for the sake of simplicity, the movement point may be a non-stationary three-dimensional object such as a pedestrian, another vehicle, or an animal. Since the moving body 63 is not stationary, the amount of movement of the movement point 64 on the image of the imaging device 12a, the imaging device 12b, . . . , and the imaging device 12n of the moving body 100 is different from the amount of movement of the stationary point 62. Accordingly, when the position estimation of the moving body 100 is performed with the feature point acquired from the movement point 64 on the moving body 63, an error of the estimated position is large.

Here, a process for reducing the influence of the moving body 63 due to the feature point will be described.

On the assumption that the number of stationary points is larger than the number of movement points 64, the average or median of the candidates (Δx, Δy, Δyaw)$_2$, (Δx, Δy, Δyaw)$_2$, . . . , and (Δx, Δy, Δyaw)$_n$ of the estimated values acquired in steps S21 to S26 is calculated, and the estimated values are determined.

Meanwhile, when the number of stationary points 62 and the number of movement points 64 are unknown, through the combination with the known obstacle detection technology for detecting the moving body as the obstacle, the moving body 63 may be detected as the obstacle, the feature points extracted from the moving body 63 in steps S21 to S23 may be removed, and the removed feature point may not be used when the position of the moving body 100 is estimated. For example, the detection unit 109 of the image processing unit 14 detects whether or not each feature point is a feature point extracted from another moving body (for example, moving body 63) different from the moving body 100, and the azimuth estimating unit 107 of the image processing unit 14 removes (excludes) the feature point detected as the feature point extracted from another moving body (for example, moving body 63) by the detection unit 109 from the feature points used during the azimuth estimation.

Positional information estimated according to the time series in the past may be stored, a position in the next frame may be predicted based on the stored past positional information, the amount of movement of the feature point acquired in steps S21 to S26 in the latest frame may be compared with the position predicted based on the stored positional information according to the time series, and the feature point having a large difference from the predicted position may be removed. For example, the prediction of the position can be calculated by using a probabilistic method such as interpolation using a polynomial of the position estimated in the past or Kalman Filter.

Figure 8:
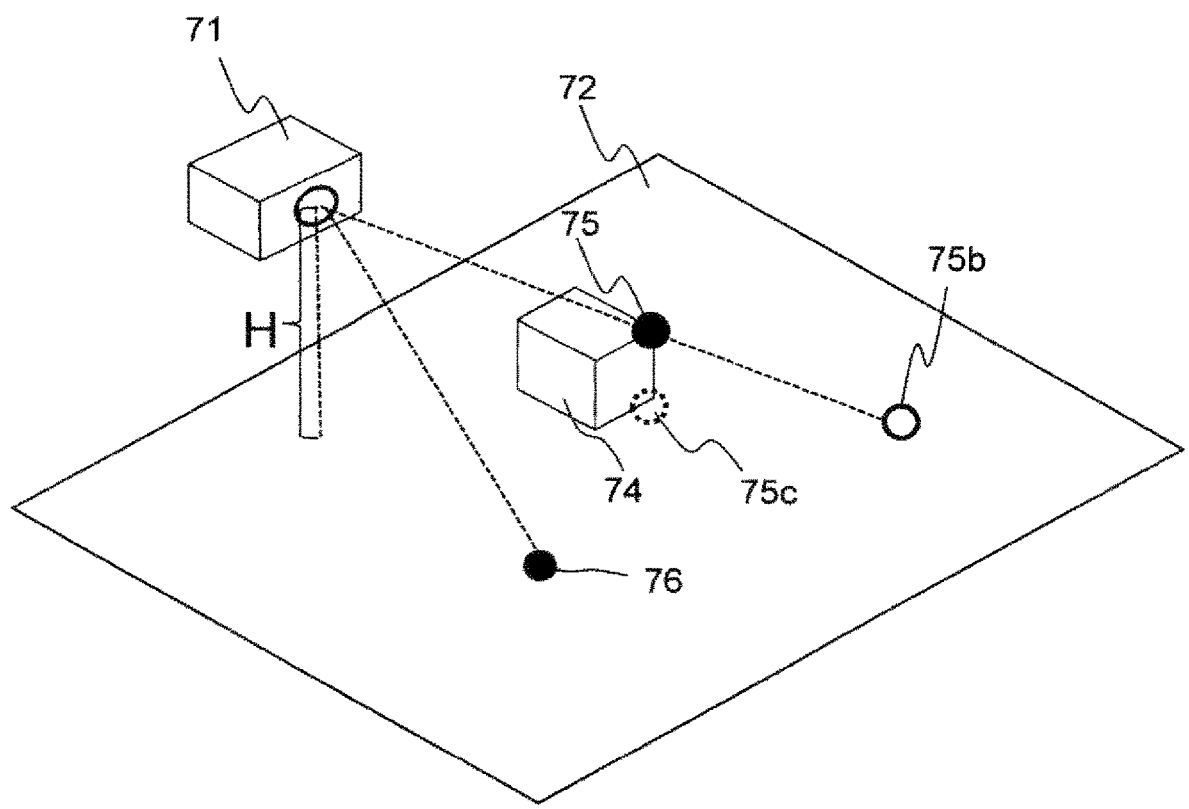
FIG. 8 is a diagram for describing a difference in position estimation processing between a monocular camera and a stereo camera in the first embodiment.

FIG. 8 is a diagram for describing a difference in position estimation processing between the monocular camera and the stereo camera in the first embodiment.

An imaging device 71 is an imaging device corresponding to the imaging device 12a, the imaging device 12b, . . . , and the imaging device 12n illustrated in FIG. 1. Here, for the sake of simplicity, although an imaging device corresponding to one of the imaging device 12a, the imaging device 12b, . . . , and the imaging device 12n will be described as the imaging device 71, a plurality of stereo cameras or monocular cameras similar to the imaging device 71 may be provided.

A road surface 72 is a road surface on which the moving body 100 is traveling. A height H is an installation height of the imaging device 71 with respect to the road surface 72. A three-dimensional object 74 is a stationary three-dimensional object on the road surface 72.

A point 75 is a point at which the imaging device 71 extracts the feature point from the three-dimensional object 74 in steps S21 to S23. A point 75b is a point on the road surface 72 in the same direction as the point 75 from the imaging device 71. A point 75c is a contact point between the three-dimensional object 74 and the road surface 72. A point 76 is a point at which the imaging device 71 extracts the feature point from the road surface 72 in steps S21 to S23.

When the imaging device 71 is the stereo camera, since the distance for the point 75 or the point 76 is able to be calculated, the parameter k may be calculated for each point by using the relationship of the graph 55 of FIG. 6B stored in the memory 16 as described above, and the azimuth and the amount of movement of the moving body 100 may be estimated by using the parameter k.

Meanwhile, when the imaging device 71 is the monocular camera, since the distance for the point 75 or the point 76 is not able to be directly calculated, other technologies are used. For example, an image in which the three-dimensional object appears and a distance to the three-dimensional object may be learned using a deep learning technology, a distance between the imaging device 71 and the three-dimensional object appearing in the image acquired in step S21 may be estimated, the parameter k may be calculated for each point by using the relationship of the graph 55 of FIG. 6B, and the azimuth and the amount of movement of the moving body 100 may be estimated by using the parameter k.

When the imaging device 71 is the monocular camera, the distance for the feature point on the road surface may be geometrically calculated by the installation height H of the imaging device 71 with respect to the road surface 72 and the installation angle of the imaging device 71 with respect to the road surface 72. Meanwhile, when a point other than the road surface 72 like the point 75 and the distance is geometrically calculated, since it is not possible to distinguish between the point 75 and the point 75b on the road surface 72 in the same direction as the point 75 from the imaging device 71, the distance for not the point 75 but the point 75b is erroneously estimated. Accordingly, the point 75c which is the contact point between the three-dimensional object 74 and the road surface 72 may be calculated by using the obstacle detection by the monocular camera, the distance for the point 75c may be calculated, the distance of the point 75 may be calculated based on the distance for the point 75c on the assumption that a straight line that connects the point 75c and the point 75 is perpendicular to the road surface 72, and the azimuth and the amount of movement of the moving body 100 may be estimated.

When the imaging device 71 is the monocular camera, the amount of movement of the moving body 100 and the point 75 may be tracked in several frames by using a Simultaneous Localization And Mapping (SLAM) technology, the distance for the point 75 may be calculated, and the azimuth and the amount of movement of the moving body 100 may be estimated.

<Supplementary Note 1>

1. A position estimating device that estimates a position of a moving body based on the amount of movement of the moving body.

The device includes an image acquiring unit (for example, imaging device 12) that acquires an image around the moving body, a moving body movement amount estimating unit (for example, moving body movement amount estimating unit 101) that estimates the amount of movement of the moving body based on the image acquired by the image acquiring unit, and a moving body position estimating unit (for example, moving body position estimating unit 102) that estimates the position of the moving body based on the amount of movement estimated by the moving body movement amount estimating unit.

The moving body movement amount estimating unit includes a first feature point extracting unit (for example, first feature point extracting unit 103) that extracts a first feature point from a first image acquired by the image acquiring unit at a first timing, a second feature extracting unit (for example, second feature point extracting unit 104) that extracts a second feature point from a second image acquired by the image acquiring unit at a second timing later than the first timing, a tracking unit (for example, tracking unit 105) that tracks the first feature point to the second feature point, a distance calculating unit (for example, distance calculating unit 106) that calculates a distance of the second feature point tracked by the tracking unit from the moving body, an azimuth estimating unit (for example, azimuth estimating unit 107) that estimates an azimuth of the moving body based on the distance of the second feature point from the moving body calculated by the distance calculating unit, and a movement amount estimating unit (for example, movement amount estimating unit 108) that estimates the amount of movement of the moving body based on the azimuth of the moving body estimated by the azimuth estimating unit.

It is possible to provide the position estimating device that accurately estimates the position of the moving body.

That is, in the estimation of the azimuth of the moving body, it is possible to accurately estimate the azimuth by considering the distance of the second feature point from the moving body.

2. In the position estimating device according to 1, the azimuth estimating unit calculates a parameter corresponding to the distance of the second feature point from the moving body, and estimates the azimuth of the moving body by using the parameter.

It is possible to accurately estimate the position of the moving body by using the parameter corresponding to the distance of the second feature point from the moving body.

3. In the position estimating device according to 1, the azimuth estimating unit estimates the azimuth of the moving body based on the amount of movement of the second feature point with respect to the moving body in a horizontal direction.

It is possible to accurately estimate the position of the moving body by using the amount of movement of the second feature point in the horizontal direction with respect to the moving body.

4. In the position estimating device according to 1, the image acquiring unit is an imaging device that is mounted on the moving body and captures and acquires an image around the moving body.

It is possible to reliably capture the region around the moving body by capturing and acquiring the image around the moving body by the imaging device mounted on the moving body.

5. In the position estimating device according to 1, the first feature point is a plurality of first feature points, the second feature point is a plurality of second feature points, the distance calculating unit calculates a distance of each of the plurality of first feature points from the moving body, and calculates a distance of each of the plurality of second feature points from the moving body, and the azimuth estimating unit estimates the azimuth of the moving body based on the distance of each of the plurality of first feature points from the moving body calculated by the distance calculating unit and the distance of each of the plurality of second feature points from the moving body calculated by the distance calculating unit.

It is possible to accurately estimate the azimuth by considering the distances of the plurality of first feature points and the plurality of second feature points from the moving body.

6. In the position estimating device according to 5, the azimuth estimating unit calculates a plurality of parameters corresponding to the distances of the plurality of first feature points from the moving body and the distances of the plurality of second feature points from the moving body, and estimates the azimuth of the moving body by using the plurality of parameters.

It is possible to accurately estimate the position of the moving body by using the parameters corresponding to the distances of the plurality of first feature points and the plurality of second feature points from the moving body.

7. In the position estimating device according to 5, the moving body movement amount estimating unit includes a detection unit (for example, detection unit 109) that detects whether or not each of the plurality of first feature points and each of the plurality of second feature points are feature points extracted from another moving body (for example, moving body 63) different from the moving body, and the azimuth estimating unit removes the feature points detected as the feature points extracted from the other moving body by the detection unit from the plurality of first feature points and the plurality of second feature points.

It is possible to accurately estimate the position of the moving body without an error by removing the feature points extracted from the other moving body from the plurality of first feature points and the plurality of second feature points.

The present invention is not limited to the aforementioned embodiment, and includes various modification examples. For example, the aforementioned embodiments are described in detail in order to facilitate easy understanding of the present invention, and are not limited to necessarily include all the described components.

Some of the components of a certain embodiment can be substituted into the components of another embodiment, and the components of another embodiment can be added to the component of a certain embodiment.

Additions, the components of another embodiment can be added, removed, and substituted to, from, and into some of the components of the aforementioned embodiments.

Further, any combination of the respective elements of the individual embodiments described above is included in the present invention.

REFERENCE SIGNS LIST

1 position estimating device
12 imaging device
13 information processing device
14 image processing unit
15 control unit
16 memory
17 display unit
100 moving body
101 moving body movement amount estimating unit
102 moving body position estimating unit
103 first feature point extracting unit
104 second feature point extracting unit
105 tracking unit
106 distance calculating unit
107 azimuth estimating unit
108 movement amount estimating unit
109 detection unit

The invention claimed is:

1. A position estimating device that estimates a position of a moving body based on an amount of movement of the moving body, the device comprising:
an image acquiring unit that acquires an image around the moving body;
an image processor programmed to:
estimate the amount of movement of the moving body based on the image acquired by the image acquiring unit; and estimate the position of the moving body based on the amount of movement, extract a first feature point from a first image acquired by the image acquiring unit at a first timing, extract a second feature point from a second image acquired by the image acquiring unit at a second timing later than the first timing, track the first feature point to the second feature point, calculate a distance of the second feature point tracked by the tracking unit from the moving body, estimate an azimuth of the moving body based on the distance of the second feature point from the moving body calculated by the distance calculating unit and a plurality of stored values of a parameter of radians per pixel that varies based on the distance of the second feature point from the moving body, and estimate the amount of movement of the moving body based on the azimuth of the moving body; and a controller that outputs a signal to the moving body to control motion of the moving body based on information provided by the image processor;

wherein the first feature point is a plurality of first feature points, the second feature point is a plurality of second feature points, the image processor calculates a distance of each of the plurality of first feature points from the moving body, and calculates a distance of each of the plurality of second feature points from the moving body, and the image processor estimates the azimuth of the moving body based on the distance of each of the plurality of first feature points from the moving body and the distance of each of the plurality of second feature points from the moving body, wherein the image processor detects whether or not each of the plurality of first feature points and each of the plurality of second feature points are feature points extracted from another moving body different from the moving body, and the image processor removes the feature points detected as the feature points extracted from the other moving body from the plurality of first feature points and the plurality of second feature points.

2. The position estimating device according to claim 1, wherein the image processor estimates the azimuth of the moving body based on the amount of movement of the second feature point with respect to the moving body in a horizontal direction.

3. The position estimating device according to claim 1, wherein the image acquiring unit is an imaging device that is mounted on the moving body.

4. The position estimating device according to claim 1, wherein the image processor calculates a plurality of parameters corresponding to the distances of the plurality of first feature points from the moving body and the distances of the plurality of second feature points from the moving body, and estimates the azimuth of the moving body by using the plurality of parameters.

* * * * *